United States Patent [19]
Smith

[11] Patent Number: 5,833,353
[45] Date of Patent: Nov. 10, 1998

[54] CAMP FIRE CHIMNEY

[76] Inventor: Kevin A. Smith, P.O. Box 1047, Leesburg, Va. 22075

[21] Appl. No.: 741,656

[22] Filed: Oct. 11, 1996

Related U.S. Application Data

[60] Provisional application No. 60/005,265, Oct. 13, 1995.
[51] Int. Cl.[6] .................................................. F21L 19/00
[52] U.S. Cl. .......................... 362/180; 362/312; 362/806; 44/532
[58] Field of Search .................................... 362/180, 312, 362/806; 431/125, 126, 286, 325; 44/532, 534, 535

[56] References Cited

U.S. PATENT DOCUMENTS

| | | | |
|---|---|---|---|
| 362,147 | 5/1887 | Corwin | 44/532 X |
| 4,952,217 | 8/1990 | Porter | 44/532 |

*Primary Examiner*—Stephen F. Husar
*Attorney, Agent, or Firm*—Beveridge, DeGrandi, Weilacher and Young, LLP

[57] ABSTRACT

A combustible device which can be ignited to furnish warmth for comfort, heat for cooking, and light for illumination, and which may also be aesthetically pleasing. The device includes a shell formed of combustible material, which defines an updraft chamber, an intake chamber located at the lower portion of the updraft chamber and being in fluid communication with both the updraft chamber and the outside of the shell, and one or more exhaust flues located at the top of the updraft chamber. The flues also are in fluid communication with both the updraft chamber and the outside of the shell, to provide an exit for smoke and ashes formed by combustion in the updraft chamber. The updraft chamber may be tapered, so that the upper portion of the updraft chamber is narrower than the lower portion of the updraft chamber. Preferably, the combustible shell is formed with an aesthetically pleasing appearance, such as a relief shaped like a face. The shell may also include a thick, solid spine along its length, to maintain the balance of the shell while it burns.

21 Claims, 2 Drawing Sheets

CAMP FIRE CHIMNEY

RELATED U.S. APPLICATION INFORMATION

This application is a continuation-in-part application of Provisional U.S. Patent Application Serial No. 60/005,265, filed on Oct. 13, 1995, which provisional application is incorporated entirely herein by reference.

BACKGROUND

1. Field of the Invention

The invention relates to a novel type of combustible device which can be ignited to provide heat for warmth or cooking, and light for illumination, and which may also be aesthetically pleasing to an observer. The invention, hereafter referred to as a campfire chimney, also provides greater safety than an open fire.

2. The Prior Art

Throughout history, open fires have been a valuable tool as well as a source of fascination. Open fires provide warmth for comfort, heat for cooking, and light for illumination. They also are aesthetically pleasing, and are sometimes lighted at parties or other social gatherings, even if they are not to be used for heat or illumination.

However, open fires are also very dangerous, in that they can quickly spread to other combustible materials not intended to be burnt. For this reason, fires are not commonly lighted at social gatherings in small areas, such as suburban backyards or small fields, since the risk of the fire spreading often outweighs any advantages which may be obtained from an open fire.

Certain types of devices have been developed to allow people to enjoy open fires at social gatherings. For example, charcoal barbecues are popular, which allow people to use an open flame for cooking. Also, "backyard" torches have been developed which can be used as illumination at parties or social gatherings. However, such torches do not provide a large amount of illumination, and similarly do not provide a significant amount of warmth. Likewise, a barbecue does not provide warmth for comfort or illumination. Neither a backyard torch nor a barbecue will provide an appearance which is particularly aesthetically pleasing.

SUMMARY OF THE INVENTION

It is an object of the present invention to provide a combustible device which can be ignited to furnish warmth for comfort, heat for cooking, and light for illumination, and which is also aesthetically pleasing as well functional. It is another object of the invention to provide a combustible device which is safer for use in small closed-in areas, such as a backyard or a small field.

In order to fulfill the objects of the invention, a combustible device, hereafter referred to as a campfire chimney, is provided which comprises a shell formed of combustible material. The shell defines an updraft chamber, an intake chamber located at the lower portion of the updraft chamber, and one or more exhaust flues located at the top of the updraft chamber. The updraft chamber is tapered, so that the upper portion of the updraft chamber is narrower than the lower portion of the updraft chamber.

The intake chamber is in fluid communication with both the updraft chamber and the outside of the shell. Thus, the intake chamber provides a passage through which outside air may flow into the updraft chamber. The flues are also in fluid communication with both the updraft chamber and the outside of the shell, and thus provide an exit for smoke and ashes formed by combustion in the updraft chamber.

Preferably, the combustible shell is formed with an aesthetically pleasing appearance, such as a relief shaped like a face. With this appearance, the campfire chimney according to the invention provides an aesthetically pleasing appearance when the shell burns.

It is also preferable that a portion of the shell include a thick, solid spine along its length, which may be conveniently located at the back of the campfire chimney. This spine serves to maintain the balance of the campfire chimney while even while the rest of the shell burns. This reduces the possibility that the campfire chimney will become unbalanced and overturn while it is burning, potentially spreading the fire to other combustible materials around the campfire chimney.

DETAILED DESCRIPTION OF PREFERRED EMBODIMENTS OF THE INVENTION

Figure 1:
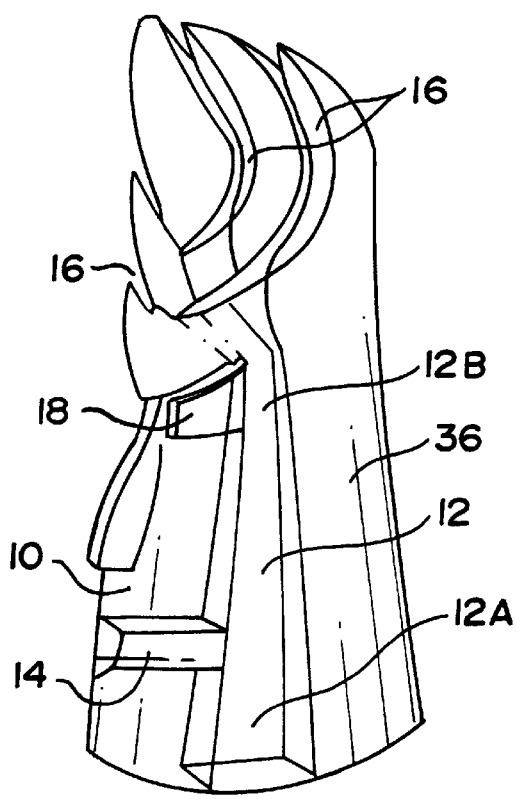
FIG. 1 is a cross sectional view of one embodiment of the invention.

A first embodiment of the invention will now be described with reference to FIG. 1. As shown in FIG. 1, the campfire chimney includes a combustible shell 10. The shell 10 defines an interior updraft chamber 12, a primary intake chamber 14, and a plurality of exhaust flues 16. The shell 10 also defines a supplemental intake chamber 18.

The updraft chamber 12 is tapered to have a pyramidal shape. That is, lower portion 12A of the chamber 12 is wider than the upper portion 12B of the chamber 12. The bottom of the updraft chamber 12 is not closed, but is instead is open to the outside of the shell 10 through the bottom of the campfire chimney.

The primary intake chamber 14 leads into the updraft chamber 12, and is in fluid communication with both the updraft chamber 12 and the outside of the shell 10. Thus, the primary intake chamber 14 provides a passage for outside air to flow into the updraft chamber 12. As can be seen from FIG. 1, the primary intake chamber 14 extends from the front of the shell 10 to the lower portion 12A of updraft chamber 12. The supplemental intake chamber 18 is also in fluid communication with both the updraft chamber 12 and the outside of the shell 10, and thus provides a supplemental passage for outside air to flow into the updraft chamber 12. The supplemental intake chamber 18 extends from the front of the shell 10 to the upper portion 12B of the updraft chamber 12.

A plurality of flues 16 extend upward from the upper portion 12B of the updraft chamber 12. These flues 16 are also in fluid communication with the outside of the shell 10. When a fire it lighted in the updraft chamber 12, these flues 16 provide an exit for the smoke, ashes, and other gases produced by the combustion in the updraft chamber 12.

Figure 2:
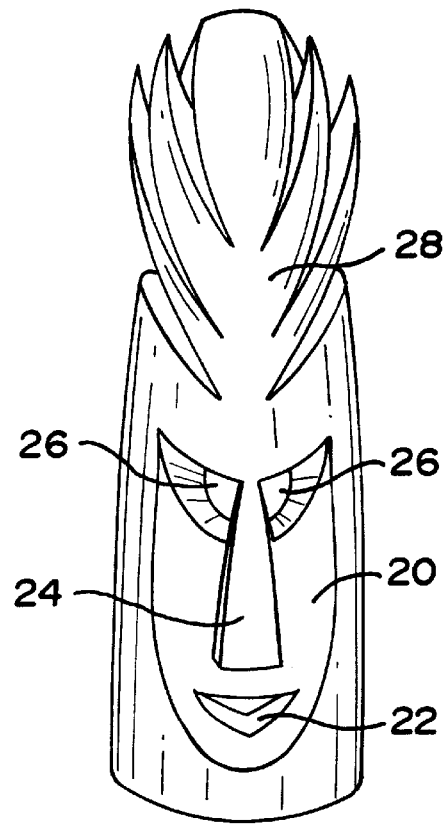
FIG. 2 is a front view of the embodiment of the invention shown in FIG. 1.

Preferably, the front of the campfire chimney presents an image of some type. With the embodiment of the campfire chimney shown in FIGS. 1 and 2, a facial relief 20 is carved on the front of the campfire chimney. Preferably, the elements of the image correspond with the structural features of the campfire chimney. For example, as shown in FIG. 2, the facial relief 20 includes a mouth 22, a nose 24, and eyes 26. Also, a headdress 28 is formed over the facial relief 20. The mouth 22 forms the entrance to the primary intake chamber 14, while the eyes 26 form the entrance to the supplemental intake chamber 18. The headdress 28 is formed to provide the flues 16. In this manner, the campfire chimney will provide an aesthetically pleasing image in addition to a functional combustion device.

The operation of the invention will now be explained with reference to FIG. 3. Before the campfire chimney is ignited, it is positioned upright on the ground so that the open bottom of the updraft chamber 12 is sealed off from the air outside of the shell 10. Preferably, the bottom of the campfire chimney is embedded in the ground deeply enough to stably support the campfire chimney in an upright position.

Next, fire starting materials, such as charcoal, paper, lighter fluid or the like, is inserted into the updraft chamber 12 through the primary intake chamber 14. The fire starting materials are then lit to start a fire inside of the updraft chamber 12. This fire is fueled by oxygen in the air coming from outside of the shell 10 through the intake chambers 14 and 18, and by the combustible material forming the shell 10 itself.

Figure 3:
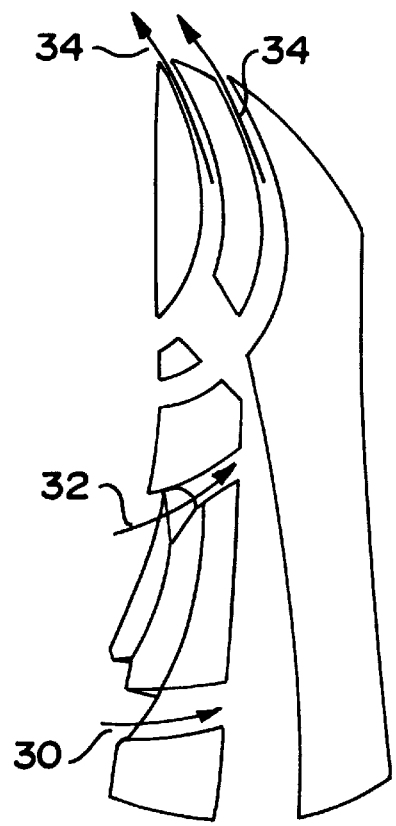
FIG. 3 is a schematic view showing the path of air, smoke and ashes in the embodiment of the invention shown in FIGS. 1 and 2.

More specifically, air is drawn from outside of the shell 10 through the mouth 22, and travels along the primary intake chamber 14 along the direction of arrow 30 shown in FIG. 3. This air then enters the lower portion 12A of the updraft chamber 12, thereby providing oxygen for the fire in the updraft chamber 12. Air is also drawn from outside of the shell 10 through the eyes 26 and along the direction of arrow 32. This air then enters the upper portion 12B of the updraft chamber 12.

Smoke and other gases, ashes, and flames produced by the fire in the updraft chamber 12 then exit the shell 10 through the flues 16 above the updraft chamber 12. The direction of the flow of the gases, ash and flames is shown by arrows 34 in FIG. 3. However, it should be noted that the campfire chimney produces very little smoke or ash when burning, as compared to other types of open fires. Instead, only flames are primarily produced. This feature further enhances the safety and convenience of the campfire chimney, and contributes to the aesthetic quality of the campfire chimney.

As noted before, the updraft chamber 12 tapers to a point at its top. This shape of the updraft chamber 12 produces the Venturi effect within the updraft chamber 12. That is, the shape of the updraft chamber 12 increases the pressure in the upper portion 12B of the updraft chamber 12, and increases the velocity of the gases and ashes traveling through the flues 16. Also, the tapered shape of the updraft chamber 12 ensures that the fire in the updraft chamber 12 is substantially covered overhead by combustible material. It is believed that this shape is responsible for the significant reduction in the amount of smoke and ash produced by the campfire chimney relative to open fires.

As the combustion within the updraft chamber 12 continues, the combustible shell 10 is burned from the inside out and from the top of the flues 16 down to the lower portion 12A of the updraft chamber 12. However, because the bottom of the updraft chamber 12 is sealed, the campfire chimney will burn primarily only to the lower portion 12A of the updraft chamber 12, to the intersection of the primary intake chamber 14 with the lower portion 12A of the updraft chamber 12.

Below this point, the campfire chimney will burn more slowly, and thus can be easily extinguished as the flames approach the ground. This reduces the chances that the flames will spread to combustible materials on the ground surrounding the campfire chimney. This is a useful feature when the campfire chimney is to be burned on a tended lawn, in that the campfire chimney can be burned without significantly damaging the lawn.

Also, while the portion of the campfire chimney above the lower portion 12A of the updraft chamber 12 is burning, the flames are substantially contained by the sides of the shell 10, so that flames can primarily escape the campfire chimney only through its top. This also reduces the chances that the flames will escape from the campfire chimney and spread to surrounding combustible materials. Also, this permits the campfire chimney to be moved by hand up until its final stages of combustion.

Preferably, the shell 10 of the campfire chimney should include a thick, solid spine 36. As shown in FIG. 1, the spine 36 may be conveniently located at the back of the campfire chimney. The spine 36 should be thick and solid enough so that it burns more slowly than the rest of the campfire chimney. Accordingly, this spine 36 will be largely intact even when the rest of the campfire chimney, down to the lower portion 12A of the updraft chamber 12, has been consumed. Thus, the spine 36 will provide support to maintain the campfire chimney in an upright position even while it burns. This reduces the risk that the campfire chimney will topple over and potentially spread flames to other combustible materials around it.

The spine 36 shown in FIG. 1 is formed simply by a thick portion of the combustible shell 10. However, those of ordinary skill in the art will appreciate that the spine 36 may be formed from a separate piece of material, which may be either combustible or incombustible.

As noted before, the campfire chimney provides light for illumination and heat for warmth and cooking. If the campfire chimney is to be used for cooking, a pan can be set over the flues 16, so that the flames produced in the updraft chamber 12 and carried up through the flues 16 heat the pan. In this instance, however, it is preferred that one or more notches be cut in the campfire chimney below the pan which intersect the flues 16, so that the gases produced in the updraft chamber 12 may escape from the campfire chimney.

Figure 4:
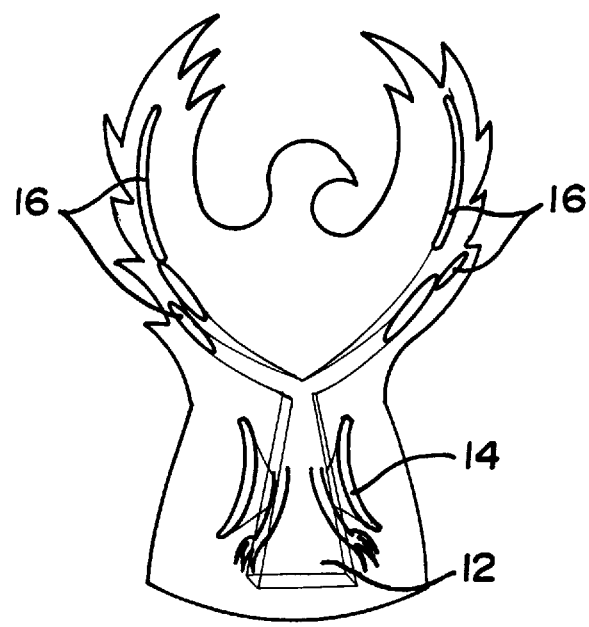
FIG. 4 is a front view of another embodiment of the invention.
Figure 5:
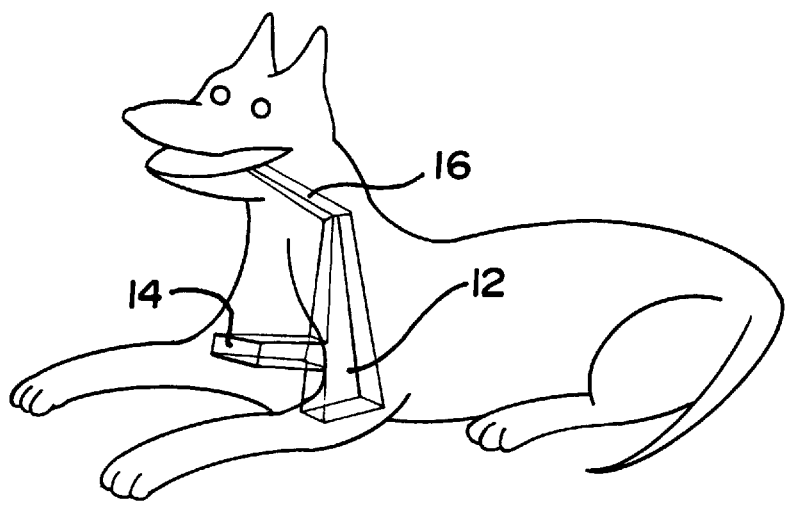
FIG. 5 is a front view of yet another embodiment of the invention.

It will be understood by those of ordinary skill that a number of variations of the disclosed embodiment are possible which fall within the scope of the invention. For example, the supplemental intake chamber 18 can be omitted. Also, alternative images other than a facial relief maybe formed on the front of the campfire chimney. For example, the front of the chimney may be formed to present the image of a bird, as shown in FIG. 4, or the image of a dragon, as shown in FIG. 5. However, it is still contemplated that the elements of whatever image is employed will still correspond with the structural features of the campfire chimney. For example, in FIG. 4, the wings 38 of the bird form the flues 16. Numerous other variations are possible within the scope of the invention.

The construction of a preferred embodiment of the invention will now be described. The shell 10 is formed from a log of wood, which preferably is solid, but which may be hollow. Preferably, the base of log should be sufficiently broad that the bottom of the campfire chimney formed from the base will stably maintain the campfire chimney in an upright position.

The updraft chamber 12 is initially formed by making a series of plunge cuts into the bottom of the log with a conventional chain saw. As noted before, the cuts should be made such that the updraft chamber 12 tapers at its upper portion 12B. Preferably, the cuts should be made so that the top of the updraft chamber 12 is just above the location for the eyes 26.

The flues 16 are then formed by a series of plunge cuts with a conventional chainsaw to be in fluid communication with the upper portion 12B of the updraft chamber 12. The flues 16 are preferably shaped according to the image to be formed an the front of the campfire chimney. In the embodiment shown in FIGS. 1–3, the flues 16 are cut in a V-shape to form the headdress 28, starting at the center of the front of the campfire chimney and extending around to the back of the campfire chimney.

The primary intake chamber 14 is then plunge cut into the log with a chainsaw, so that the primary intake chamber 14 is in fluid communication with the updraft chamber by a series of plunged cuts with a chainsaw. Also, the supplemental intake chamber 18 is plunge cut into the log with a chainsaw. Finally, the remaining features of the image on the front of the campfire chimney are formed with a chainsaw or other tool.

Preferably, a log of ash wood is used to form the shell 10, because of the relative ease of carving this type of wood, its lightness, and its ability to burn while still green. However, other types of wood maybe used to form campfire chimney. Preferably, hollow butt logs or crotch logs are used for the shell 10, since these types of logs are relatively inexpensive.

When a crotch log is used, the large end of the log may serve as the base of the shell 10. The facial relief 20 is then cut into the lower portion of the crotch. For example, the limb of the crotch can be used for form the nose 24. The headdress 28 is cut into the upper portion of the crotch.

Alternatively, the campfire chimney be formed of material other than logs. For example, the campfire chimney may be molded from a combustible material, or combustible material may be pressed formed to form the campfire chimney. The material forming the shell 10 may be varied to control the burning time of the campfire chimney. Similarly, the thickness of the shell 10 may be varied to control the burning time of the campfire chimney.

Further variations and modifications of the foregoing will be apparent to those skilled in the art, and are intended to be encompassed within the scope of the invention.

I claim:

1. A combustible device comprising a shell formed of combustible material, the shell defining
    an updraft chamber, the updraft chamber being tapered such that the upper portion of the updraft chamber is narrower than the lower portion of the updraft chamber,
    a separate intake chamber in fluid communication with an outside of the shell and with a lower portion of the updraft chamber, and
    at least one exhaust flue in fluid communication with an upper portion of the updraft chamber.

2. A combustible device as recited in claim 1, wherein a relief is formed on an outer surface of the shell.

3. A combustible device as recited in claim 1, wherein the shell includes a spine portion along a length of the shell.

4. A combustible device as recited in claim 1, wherein the shell further defines a supplemental intake chamber in fluid communication with the outside of the shell and with the upper portion of the updraft chamber.

5. A combustible device as recited in claim 1, wherein a bottom portion of the updraft chamber is open to the outside of the shell.

6. A combustible device as recited in claim 1, further including a spine mounted along a length of the shell.

7. A combustible device as recited in claim 1, wherein the shell is formed of wood.

8. A combustible device comprising a shell formed of combustible material, the shell defining
    an updraft chamber,
    a separate intake chamber in fluid communication with an outside of the shell and with a lower portion of the updraft chamber,
    at least one exhaust flue in fluid communication with an upper portion of the updraft chamber, and
    a supplemental intake chamber in fluid communication with the outside of the shell and with the upper portion of the updraft chamber.

9. A combustible device as recited in claim 8, wherein the updraft chamber is tapered such that the upper portion of the updraft chamber is narrower than the lower portion of the updraft chamber.

10. A combustible device as recited in claim 8, wherein a relief is formed on an outer surface of the shell.

11. A combustible device as recited in claim 8, wherein the shell includes a spine portion along a length of the shell.

12. A combustible device as recited in claim 8, wherein a bottom portion of the updraft chamber is open to the outside of the shell.

13. A combustible device as recited in claim 8, further including a spine mounted along a length of the shell.

14. A combustible device as recited in claim 8, wherein the shell is formed of wood.

15. A combustible device comprising a shell formed of combustible material, the shell defining
    an updraft chamber, a bottom portion of the updraft chamber being open to the outside of the shell,
    a separate intake chamber in fluid communication with an outside of the shell and with a lower portion of the updraft chamber, and
    at least one exhaust flue in fluid communication with an upper portion of the updraft chamber.

16. A combustible device as recited in claim 15, wherein the updraft chamber is tapered such that the upper portion of the updraft chamber is narrower than the lower portion of the updraft chamber.

17. A combustible device as recited in claim 15, wherein a relief is formed on an outer surface of the shell.

18. A combustible device as recited in claim 15, wherein the shell includes a spine portion along a length of the shell.

19. A combustible device as recited in claim 15, wherein the shell further defines a supplemental intake chamber in fluid communication with the outside of the shell and with the upper portion of the updraft chamber.

20. A combustible device as recited in claim 15, further including a spine mounted along a length of the shell.

21. A combustible device as recited in claim 15, wherein the shell is formed of wood.

* * * * *